United States Patent
Mori et al.

(10) Patent No.: US 10,444,446 B2
(45) Date of Patent: Oct. 15, 2019

(54) OPTICAL MODULE

(71) Applicant: FUJITSU COMPONENT LIMITED, Tokyo (JP)

(72) Inventors: Tatsuhiro Mori, Tokyo (JP); Takeshi Okuyama, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/108,673

(22) Filed: Aug. 22, 2018

(65) Prior Publication Data
US 2019/0064455 A1    Feb. 28, 2019

(30) Foreign Application Priority Data
Aug. 24, 2017   (JP) ................. 2017-160952

(51) Int. Cl.
*G02B 6/42*    (2006.01)
*G02B 6/43*    (2006.01)

(52) U.S. Cl.
CPC .......... *G02B 6/4206* (2013.01); *G02B 6/428* (2013.01); *G02B 6/4239* (2013.01); *G02B 6/4245* (2013.01); *G02B 6/4249* (2013.01); *G02B 6/4257* (2013.01); *G02B 6/4295* (2013.01); *G02B 6/43* (2013.01)

(58) Field of Classification Search
CPC .. G02B 6/4206; G02B 6/4257; G02B 6/4295; G02B 6/43; G02B 6/4245; G02B 6/428
See application file for complete search history.

(56) References Cited

U.S. PATENT DOCUMENTS

| 7,781,236 B2 | 8/2010 | Suzuki et al. |
| 9,316,799 B2 | 4/2016 | Shiraishi |
| 2016/0170160 A1 * | 6/2016 | Akabane ............. G02B 6/4239 385/14 |

FOREIGN PATENT DOCUMENTS

| JP | 2009-069360 | 4/2009 |
| JP | 2014-102399 | 6/2014 |

* cited by examiner

*Primary Examiner* — John Bedtelyon
(74) *Attorney, Agent, or Firm* — IPUSA, PLLC

(57) ABSTRACT

An optical module includes a lens sheet having at least one lens on one surface thereof, a substrate having at least one of a light emitter or a light receiver on one surface thereof, and an adhesive film configured to bond the lens sheet to the substrate, wherein a protrusion is formed on the lens sheet so as to surround the lens.

6 Claims, 17 Drawing Sheets

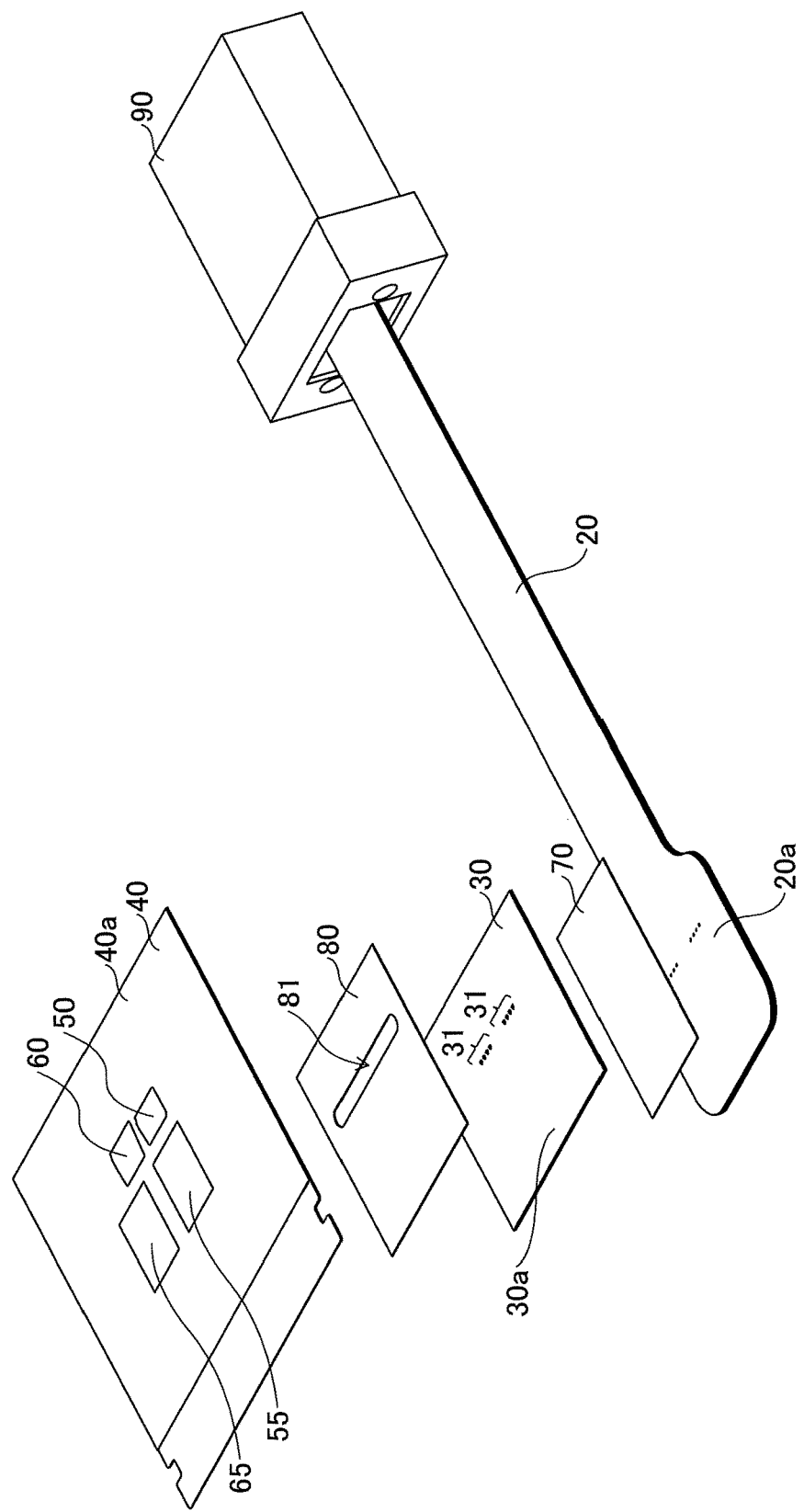

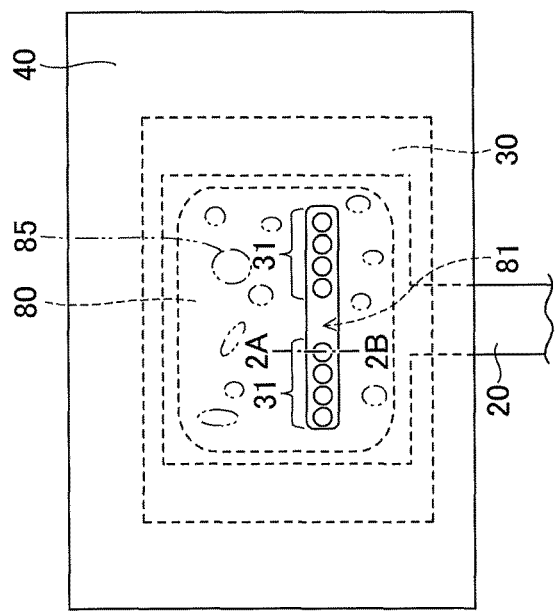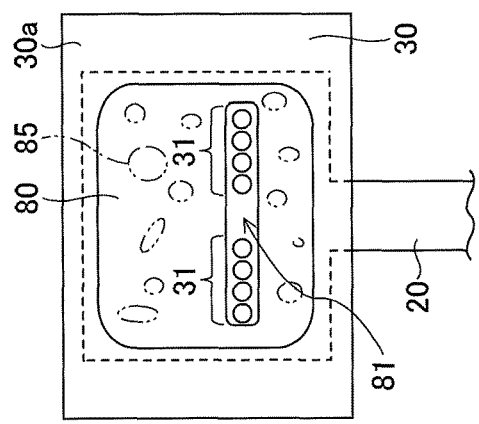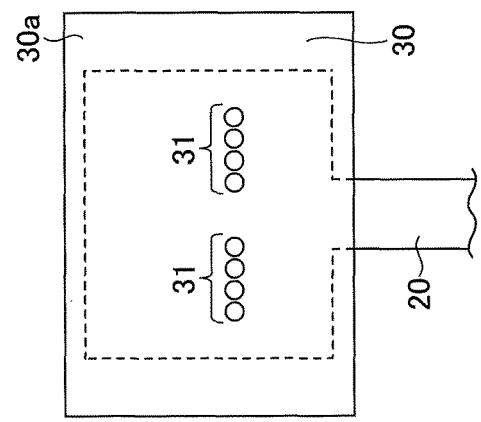

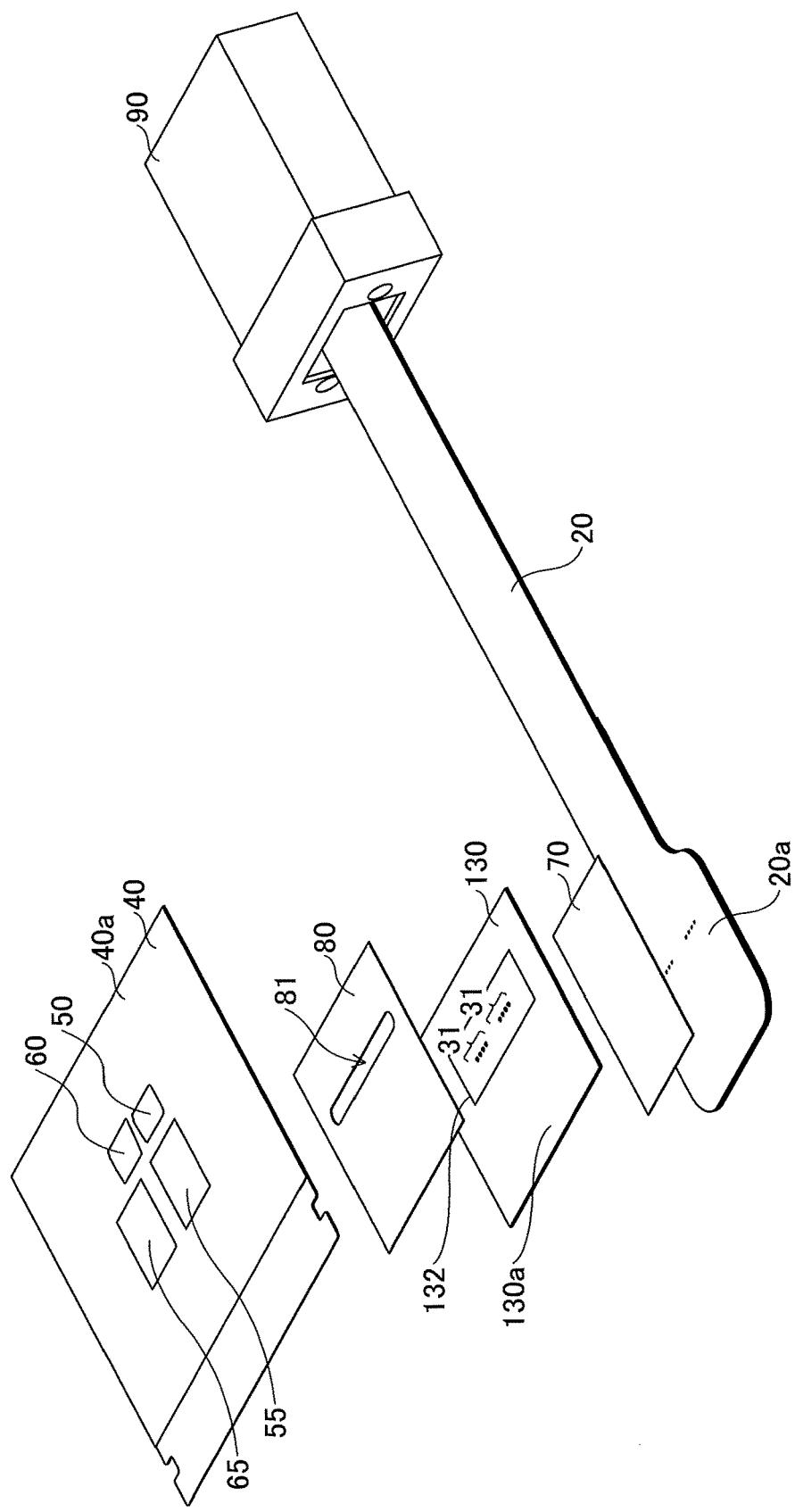

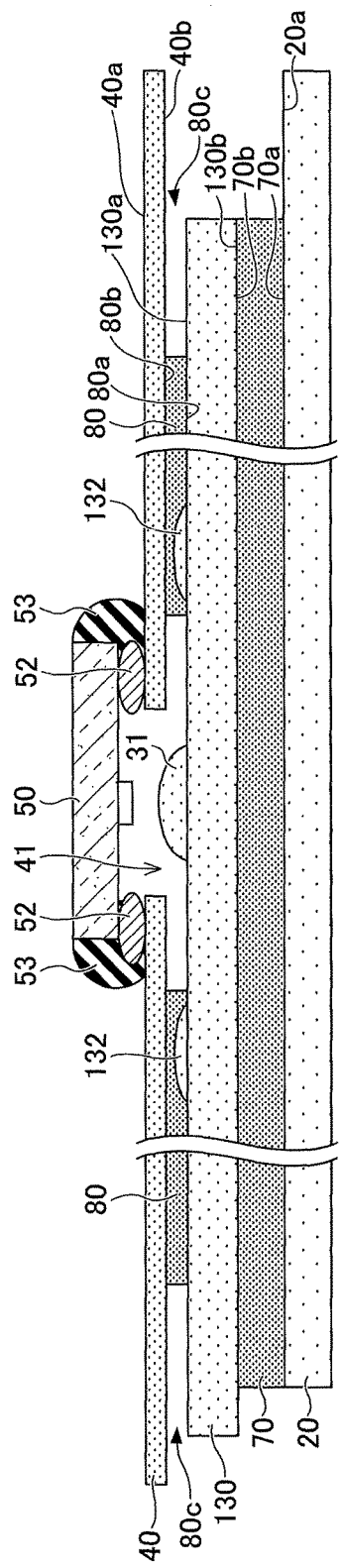
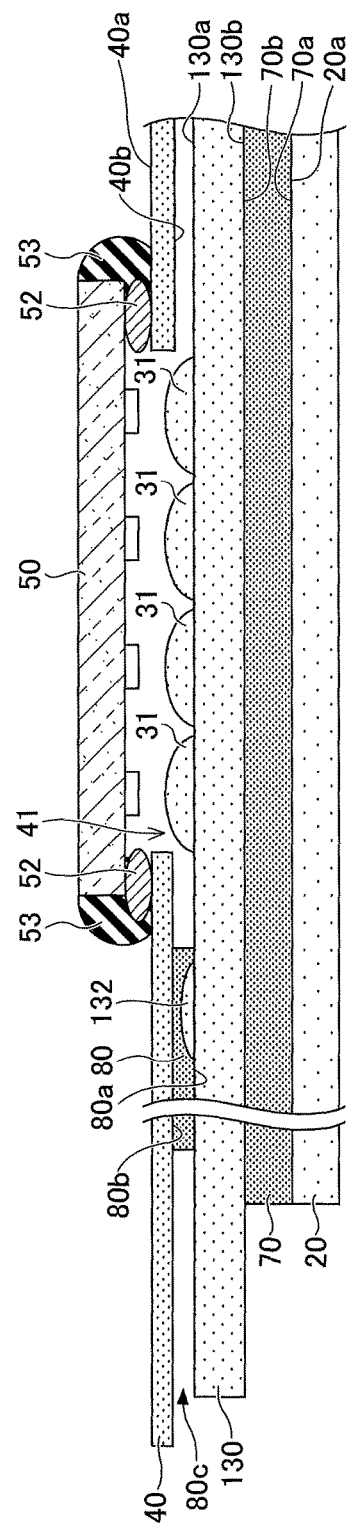
FIG.10A
FIG.10B

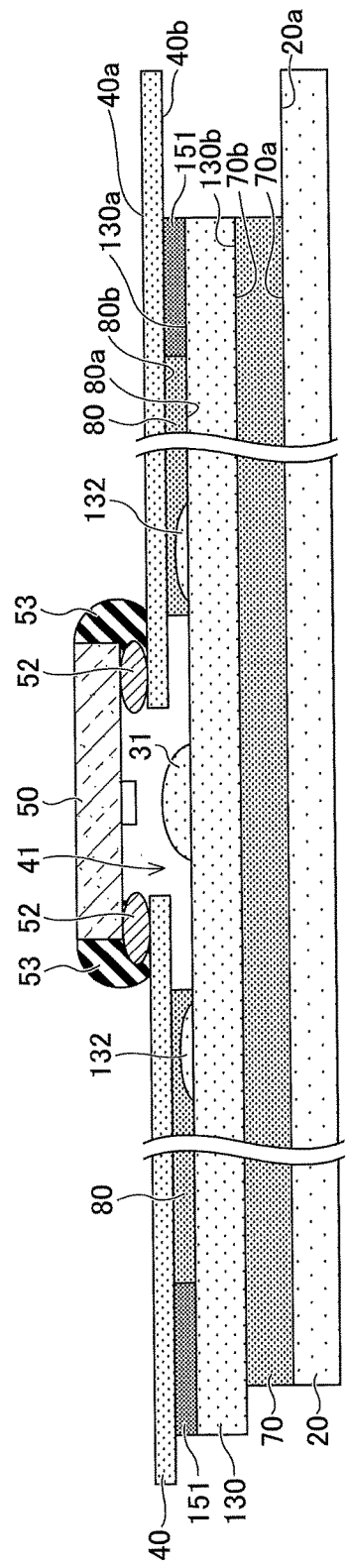
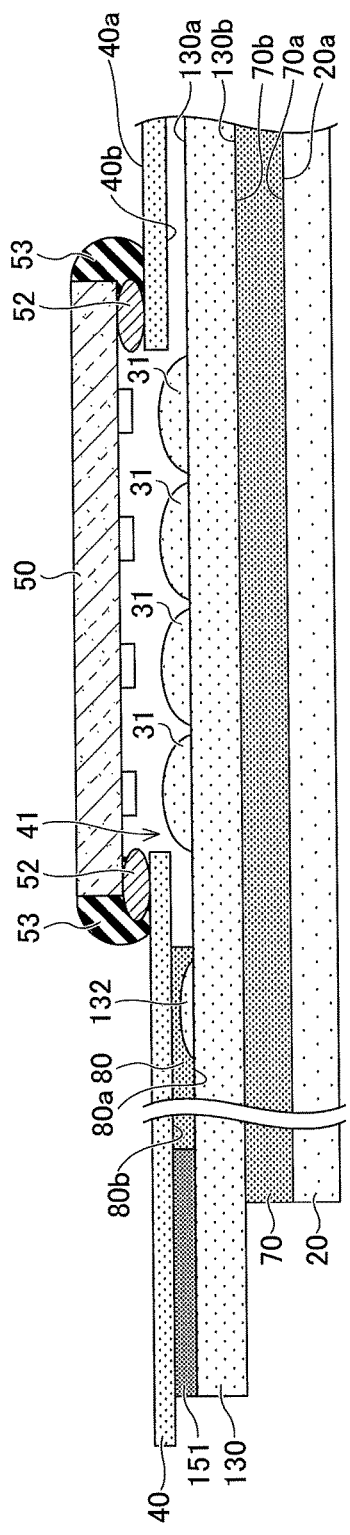

OPTICAL MODULE

CROSS-REFERENCE TO RELATED APPLICATIONS

This application is based upon and claims the benefit of priority of Japanese Patent Application No. 2017-160952, filed on Aug. 24, 2017, the entire contents of which are incorporated herein by reference.

BACKGROUND OF THE INVENTION

1. Field of the Invention

The disclosures herein generally relate to an optical module.

2. Description of the Related Art

The Quad Small Form-factor Pluggable (QSFP) specification is a communication interface standard for optical communications. A QSFP optical module compatible with the QSFP includes an optical module in which a light emitter and a light receiver are mounted on an optical waveguide. The optical module is manufactured as follows. First, a flexible substrate provided with the light emitter and the light receiver, a lens sheet having lenses, and the optical waveguide are bonded to each other via adhesive sheets. Subsequently, ultraviolet curing resin or an adhesive is applied into gaps between the members so as to fix the outer peripheries of the adhesive sheets.

The optical module manufactured in the above-described manner may include air bubbles entrapped between the lens sheet and the adhesive sheet when the adhesive sheet is bonded to the lens sheet and also between the adhesive sheet and the flexible substrate when the flexible substrate is bonded to the adhesive sheet.

If the entrapped air bubbles move, the entrapped air bubbles may connect to each other and may create voids between the lens sheet/flexible substrate and the adhesive sheet. In this case, the adhesive may flow through the voids into a region where the lenses are disposed and may attach to any of the lenses, resulting in a defect. Therefore, after the adhesive sheet is bonded to the lens sheet or after the flexible substrate is bonded to the adhesive sheet, it is necessary to remove the entrapped air and release it to the outside of the adhesive sheets by using, for example, a cotton swab.

Because such entrapped air is manually removed one by one, a manufacturing process of optical modules takes time and costs may increase.

In light of the above, an optical module that does not require a process for removing entrapped air after an adhesive sheet is bonded to a lens sheet or after a flexible substrate is bonded to an adhesive sheet, which can thus be manufactured at a low cost, is desired.

RELATED-ART DOCUMENTS

Patent Documents

[Patent Document 1] Japanese Laid-open Patent Publication No. 2009-69360

[Patent Document 2] Japanese Laid-open Patent Publication No. 2014-102399

SUMMARY OF THE INVENTION

According to an aspect of the embodiment, an optical module includes a lens sheet having one or more lenses on one surface thereof, a substrate having a light emitter or a light receiver on one surface thereof, and an adhesive film configured to bond the one surface of the lens sheet to another surface of the substrate, wherein a protrusion region is formed on the one surface of the lens sheet so as to surround the one or more lenses.

BRIEF DESCRIPTION OF THE DRAWINGS

FIG. 1 is an exploded perspective view of an optical module;

FIGS. 2A through 2C are drawings that depict a manufacturing process of the optical module;

FIG. 4 is an exploded perspective view of an optical module according to a first embodiment;

FIGS. 10A and 10B are drawings that depict the manufacturing process of the first embodiment;

FIGS. 11A and 11B are drawings that depict the manufacturing process of the first embodiment;

DESCRIPTION OF THE PREFERRED EMBODIMENTS

Figure 3:
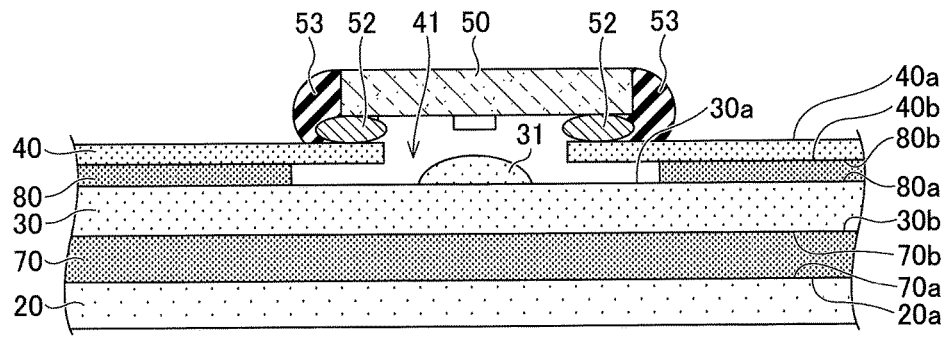
FIG. 3 is a cross-sectional view of a main portion of the optical module.

According to at least one embodiment, an optical module allows processes for manufacturing the optical module to be reduced and the optical module to be manufactured at a low cost because a process for removing air entrapped between a lens sheet and an adhesive sheet or between an adhesive sheet and a flexible substrate is not required.

In the following, embodiments of the present invention will be described with reference to the accompanying drawings. In the drawings, the same elements are denoted by the same reference numerals.

Air entrapped between an adhesive sheet and a lens sheet or a flexible substrate will be described. FIG. 1 is an exploded perspective view of an optical module. In the optical module illustrated in FIG. 1, a lens sheet 30 and a flexible substrate are stacked above a sheet-shaped optical waveguide 20.

A ferrule 90 with a lens is connected to one end of the optical waveguide 20. Lenses 31 are formed on a surface 30a of the lens sheet 30. A surface 20a of the optical waveguide 20 and the lens sheet 30 are bonded to each other via an adhesive sheet 70.

A light emitter 50, a light receiver 60, a driver 55, and a TIA (transimpedance amplifier) 65 are mounted on a surface 40a of the flexible substrate 40 through bumps (not illustrated).

The flexible substrate 40 has a through-hole disposed in a path of light emitted from the light emitter 50 and light incident on the light receiver 60, and is bonded to the lens sheet 30 via an adhesive sheet 80. Also, the adhesive sheet 80 has a through-hole 81 disposed in a path of light.

In order to manufacture an optical module, the adhesive sheet 70 is bonded to the optical waveguide 20 first, and the lens sheet 30 is bonded to the adhesive sheet 70. FIG. 2A is a top view of the optical module in this state. Next, as illustrated in FIG. 2B, the adhesive sheet 80 is bonded to the lens sheet 30. As the adhesive sheet 80 is provided with the through-hole 81, the lenses 31 and the through-hole 81 are aligned first, and the adhesive sheet and the lens sheet are bonded to each other. At this time, entrapped air 85 indicated by dashed-two dotted lines is formed between the lens sheet 30 and the adhesive sheet 80. Therefore, the entrapped air 85 needs to be removed by using a cotton swab, for example. Subsequently, as illustrated in FIG. 2C, the substrate 4 is bonded to the adhesive sheet 80. At this time, entrapped air 85 is formed between the adhesive sheet 80 and the flexible substrate 40. Therefore, the entrapped air is removed by using a cotton swab, for example. In FIGS. 2A through 2C, the adhesive sheet 70 is omitted for convenience. In FIG. 2C, the light emitter 50, the light receiver 60, the driver 55, and the TIA 65 are omitted.

FIG. 3 is a cross-sectional view of the optical module taken through a dashed-dotted line 2A-2B of FIG. 2C. As illustrated in FIG. 3, the adhesive sheet 80 is bonded to the surface 30a of the lens sheet 30, and a surface 40b of the flexible substrate 40 is bonded to the adhesive sheet 80. The light emitter 50 is coupled to the surface 40a through bumps 52. Sides of the bumps 52 and of the light emitter 50 are covered by side-fill 53. Although not illustrated, the light receiver 60 is coupled to the flexible substrate 40 through bumps, and sides of the bumps and of the light receiver 60 are covered by side-fill similarly to the above.

The flexible substrate 40 has a through-hole 41 disposed in a path of light emitted from the light emitter 50 and light incident on the light receiver 60. Further, the adhesive sheet 70 is bonded to the surface 20a of the waveguide 20. The lens sheet 30 is bonded to a surface 70b of the adhesive sheet 70.

As described, when the adhesive sheet 80 is bonded to the lens sheet 30, air 85 is entrapped between the lens sheet 30 and the adhesive sheet 80, forming voids. Also, when the flexible substrate 40 is bonded to the adhesive sheet 80, air 85 is entrapped between the adhesive sheet 80 and the flexible substrate 40, forming voids. With regard to this issue, an investigation was conducted.

As a result, it was conceived that the reason why the entrapped air 85 is formed between the lens sheet 30 and the adhesive sheet 80 is attributed to the fact that the both surfaces are flat. It was also conceived the reason why the entrapped air 85 is formed between the adhesive sheet 80 and the flexible substrate 40 is attributed to the fact that the both surfaces are flat.

In general, when flat surfaces are brought into contact with each other, the surfaces do not make full contact at the same time. The surfaces are brought into contact with each other at multiple portions first, and subsequently, regions of contact expand. As a result, air remains in portions interposed between the multiple regions where the surfaces make contact, and air 85 becomes entrapped. The embodiments herein are based on the above-described results of investigation.

First Embodiment

Next, referring to FIG. 4, an optical module according to a first embodiment will be described. FIG. 4 is an exploded perspective view of an optical module according to the present embodiment. In the optical module according to the present embodiment, a lens sheet 130 and the flexible substrate 40 are stacked on the sheet-shaped optical waveguide 20.

The optical waveguide 20 includes a core confined between cladding layers. The ferrule 90 with the lens is connected to one end of the optical waveguide 20. Lenses 31 are formed on a surface 130a of the lens sheet 130. A protrusion 132 protruding from the surface 130a is provided around the lenses 31. In FIG. 4, the protrusion 132 is closed, and the lenses 31 are formed in a region surrounded by the closed protrusion 132.

The surface 20a of the optical waveguide 20 and the lens sheet 130 are bonded to each other via an adhesive sheet 70. A mirror (not illustrated) is formed at the other end of the optical waveguide by cutting a part of the waveguide 20 in a V shape.

The light emitter 50, the light receiver 60, the driver 55, and the TIA 65 are mounted on the surface 40a of the flexible substrate 40. The light emitter 50 has a plurality of light-emitting portions, and is, for example, a vertical-cavity surface-emitting laser (VCSEL). The light receiver 60 has a plurality of light-receiving portions, and is, for example, a photodiode. The driver 55 is an integrated circuit (IC) that drives the light emitter 50. The TIA 65 is an IC that converts an electrical current generated by light detected by the light receiver 60 into voltage.

The flexible substrate 40 has a through-hole 41 disposed in a path of light emitted from the light emitter 50 and light incident on the light receiver 60. Further, the flexible substrate 40 is bonded to the lens sheet 130 via the adhesive sheet 80. Therefore, the adhesive sheet 80 has the through-hole 81 disposed in the path of light. The protrusion 132 is positioned along the periphery of the through-hole 81.

The light emitter 50, the light receiver 60, the driver 55, and the TIA 65 are mounted on the flexible substrate 40 through bumps, although not illustrated.

The adhesive sheets 70 and 80 are optical clear adhesive (OCA) sheets mainly formed of acrylic-based or polyurethane-based resin materials, and are double-sided adhesive sheets.

Next, referring to FIGS. 5A through 9B, a process for bonding the lens sheet 130 and the flexible substrate 40 of the optical module according to the present embodiment will be described. In the FIGS. 5A through 9A, the adhesive sheet 70 is not depicted.

Figure 5A:
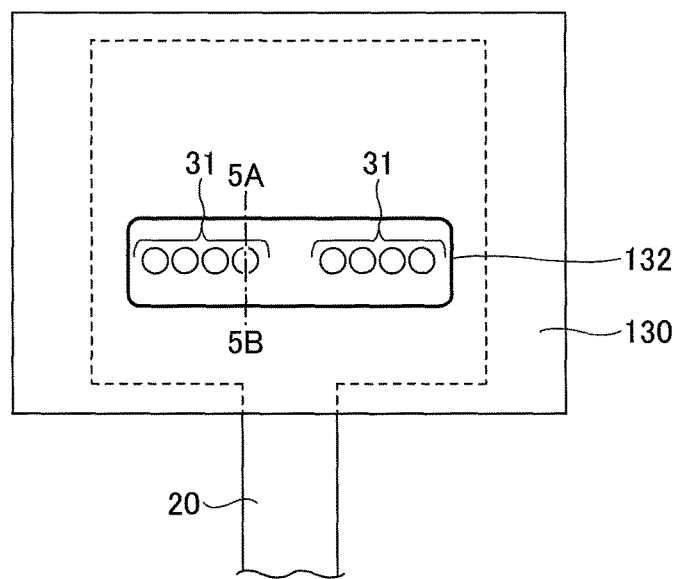
FIGS. 5A and 5B are drawings that depict a manufacturing process of the first embodiment.
Figure 5B:
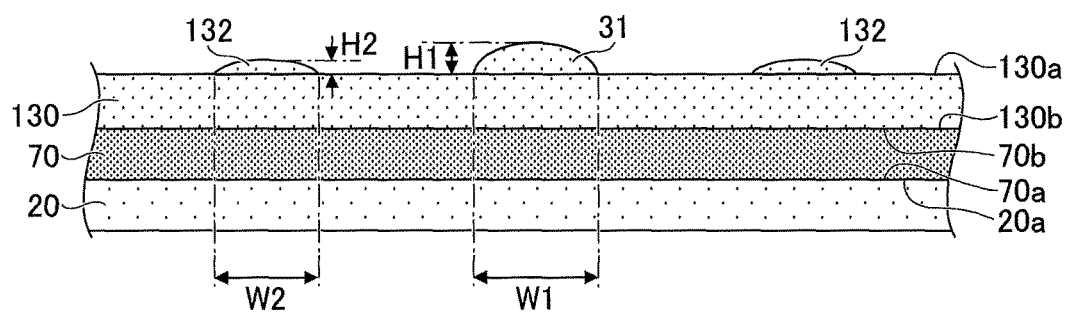

FIGS. 5A and 5B illustrate examples in which the adhesive sheet 70 is bonded to the optical waveguide 20, and the lens sheet 130 is bounded to the adhesive sheet 70. FIG. 5A is a top view of the optical module in this process, and FIG. 5B is a cross-sectional view of the optical module taken through a dashed-dotted line 5A-5B of FIG. 5A.

The surface 130a of the lens sheet 130 is provided with the lenses 31, and the protrusion 132 is provided so as to surround the lenses 31. The protrusion 132 is closed. A height H1 of each of the lenses 31 is approximately 30 μm, and a width W1 of each of the lenses 31 is 100 μm. A height H2 of the protrusion 132 is greater than or equal to 10 μm and less than or equal to 15 μm. The height H2 is less than or equal to half the height H1. A width W2 of the protrusion 132 is greater than or equal to 100 μm and less than or equal to 1,000 μm. Further, an upper surface of the protrusion 132 has a curved surface.

Next, with the lens sheet 130 and the adhesive sheet 80 facing each other, the lenses 31 and the through-hole of the adhesive sheet 80 are aligned and the adhesive sheet 80 is bonded to the lens sheet 130.

Figure 6A:
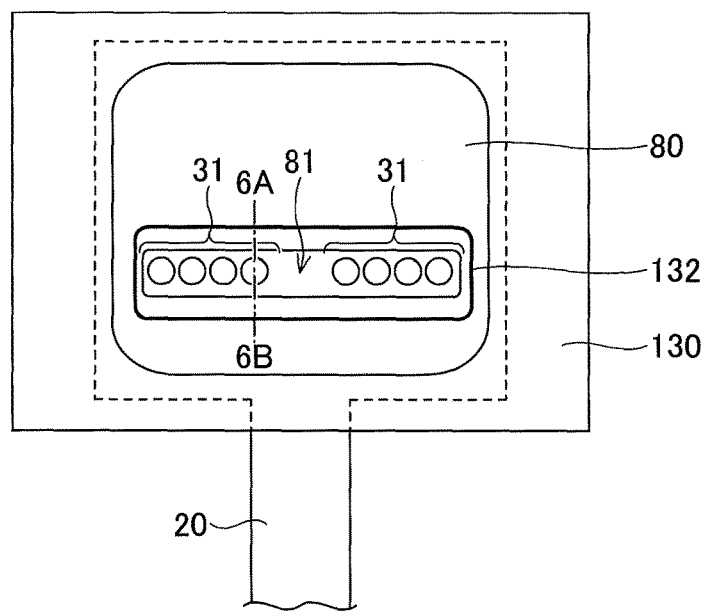
FIGS. 6A and 6B are drawings that depict the manufacturing process of the first embodiment.
Figure 6B:
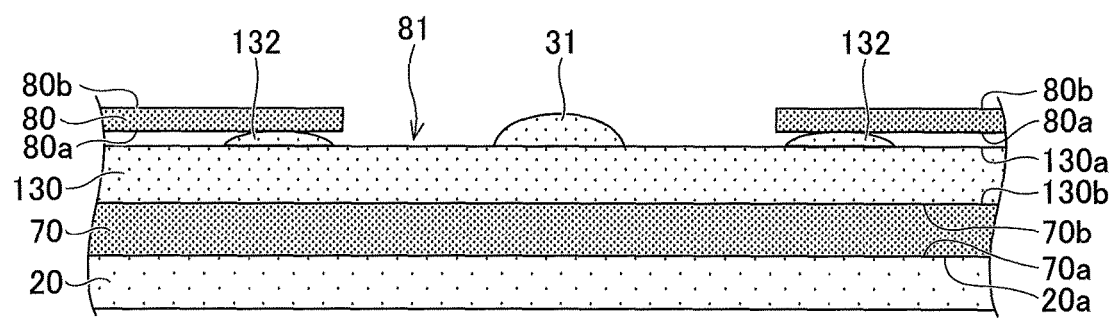

The lenses 31 and the through-hole 81 are aligned such that the protrusion 132 is positioned outside the through-hole 81. Subsequently, the adhesive sheet 80 is bonded to the lens sheet 130. At this time, as illustrated in FIG. 6B, the top of the protrusion 132 makes contact with the adhesive sheet 80. Namely, except for a region where the lenses 31 are disposed, the protrusion 132 protrudes more than other regions of the lens sheet 130. Thus, the adhesive sheet 80 initially makes contact with the top of the protrusion 132. Further, as the upper surface of the protrusion 132 has the curved surface, the protrusion 132 makes point contact with the adhesive sheet 80 in a cross-sectional direction of FIGS. 6A and 6B. FIG. 6A is a top view of the optical module in this state, and FIG. 6B is a cross-sectional view of the optical module taken through a dashed-dotted line 6A-6B of FIG. 6A.

Figure 7A:
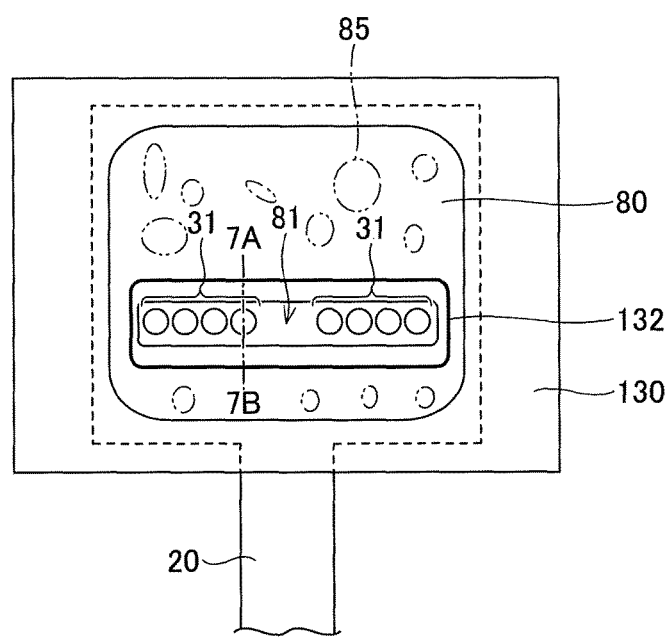
FIGS. 7A and 7B are drawings that depict the manufacturing process of the first embodiment.
Figure 7B:
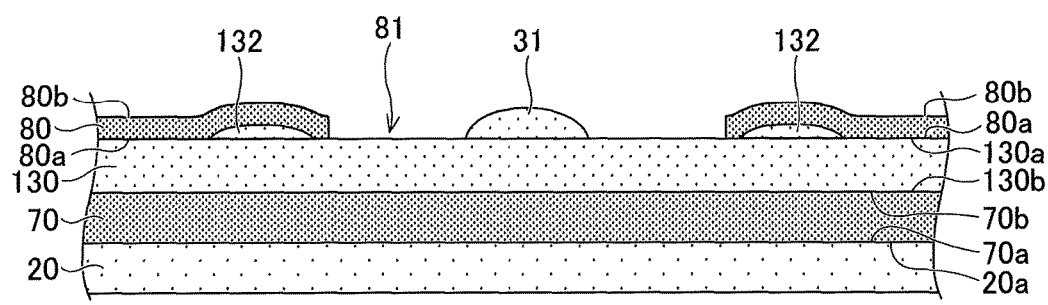

Subsequently, in the state of FIG. 6B, the adhesive sheet 80 is pressed toward the lens sheet 130 such that the adhesive sheet 80 and the lens sheet 130 make close contact with each other, as illustrated in FIG. 7B. As a result, a region of contact between the protrusion 132 and the adhesive sheet 80 expands from the initial point of contact, and the adhesive sheet 80 is bonded to the surface 130a of the lens sheet 130. In the present embodiment, the region of contact between the lens sheet 130 and the adhesive sheet 80 expands outwardly from the initial point of contact between the protrusion 132 and the adhesive sheet 80. Thus, air remaining between the adhesive sheet and the lens sheet is pushed outward. Further, at the time of starting the bonding process, no entrapped air 85 is formed in the area where the protrusion 132 and the adhesive sheet make contact with other. In this way, the adhesive sheet 80 is bonded so as to cover the protrusion 132. Thus, the lens sheet 130 and the adhesive sheet 80 make close contact with each other in the protrusion region 132. Further, on the outside of the protrusion 132, there may be a case in which entrapped air 85 is formed between the lens sheet 130 and the adhesive sheet 80. However, even if entrapped air 85 is formed on the outside of the protrusion 132, the entrapped air 85 does not expand to the lens side because the lens sheet 130 and the adhesive sheet 80 make close contact with each other at the top of the protrusion 132. Accordingly, it is possible to reduce the possibility that an adhesive applied to the periphery of the adhesive sheet may flow through entrapped air 85 into the lens side. Also, entrapped air 85 formed on the outside of the protrusion 132 is not required to be removed. FIG. 7A is a top view of the optical module in this state, and FIG. 7B is a cross-sectional view of the optical module taken through a dashed-dotted line 7A-7B of FIG. 7A.

Figure 8A:
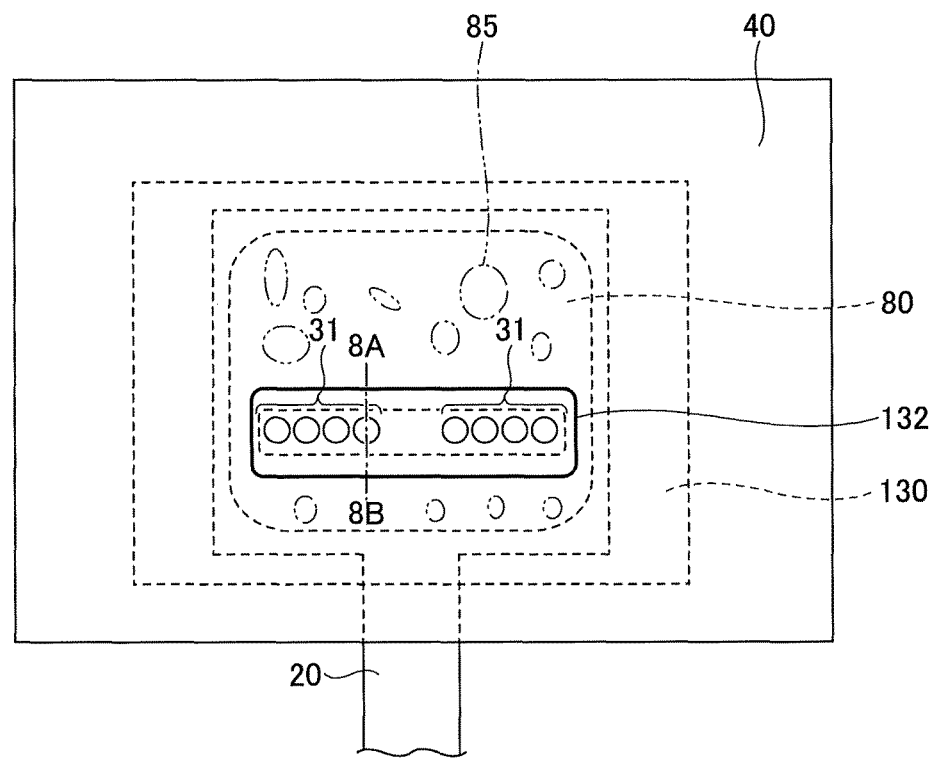
FIGS. 8A and 8B are drawings that depict the manufacturing process of the first embodiment.
Figure 8B:
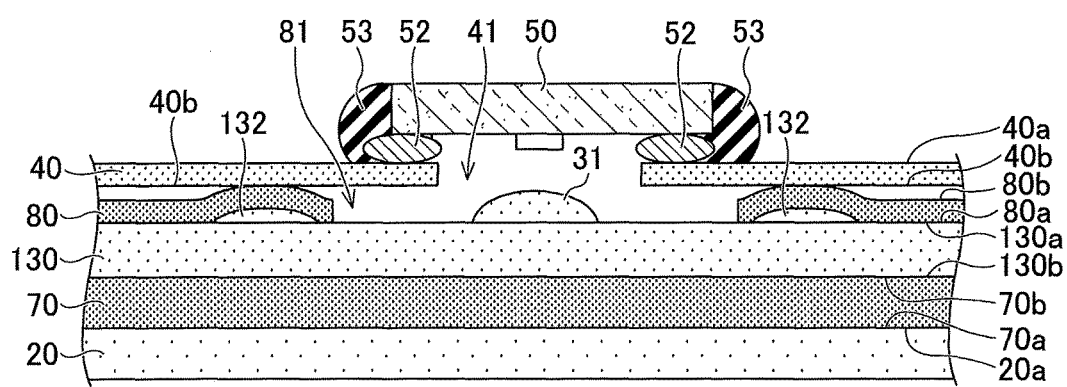

Next, the flexible substrate 40 is bonded to the adhesive sheet 80. As illustrated in FIGS. 8A and 8B, a portion of the adhesive sheet 80 under which the protrusion 132 is formed protrudes more upward (in the figure) than the other portions. Thus, this portion of the adhesive sheet 80 makes contact with the surface 40b first. In this case, the adhesive sheet 80 and the flexible substrate 40 make point contact with each other in the cross-sectional direction. Thus, no entrapped air 85 is formed at the point because the adhesive sheet and the flexible substrate make close contact. FIG. 8A is a top view of the optical module in this state, and FIG. 8B is a cross-sectional view taken through a dashed-dotted line 8A-8B of FIG. 8A.

Figure 9A:
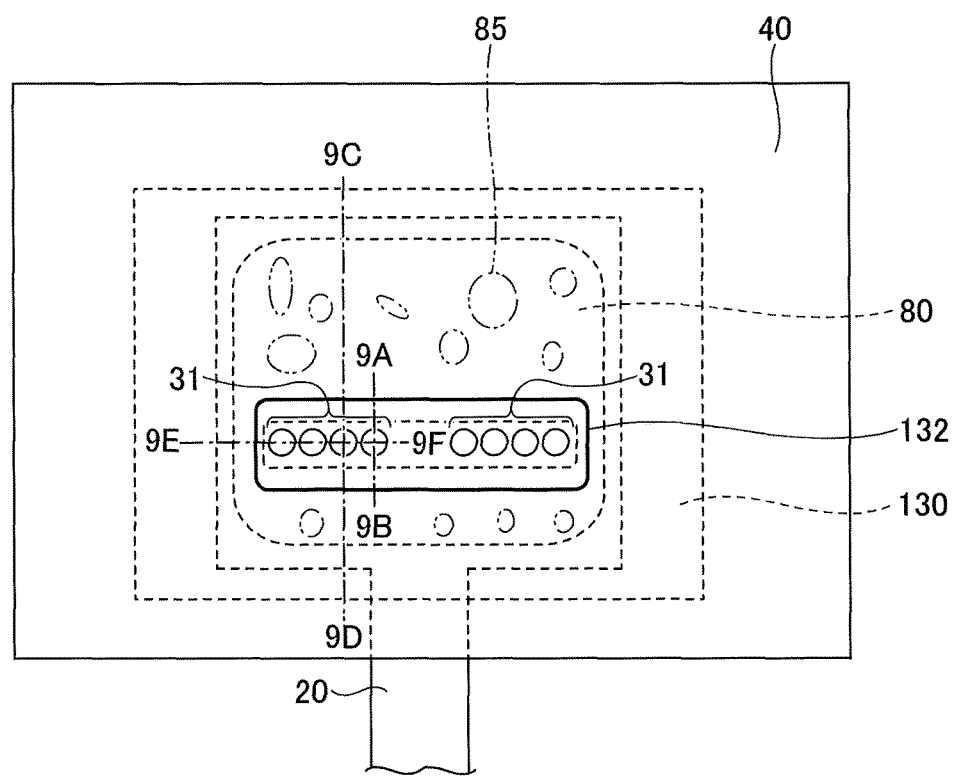
FIGS. 9A and 9B are drawings that depict the manufacturing process of the first embodiment.
Figure 9B:
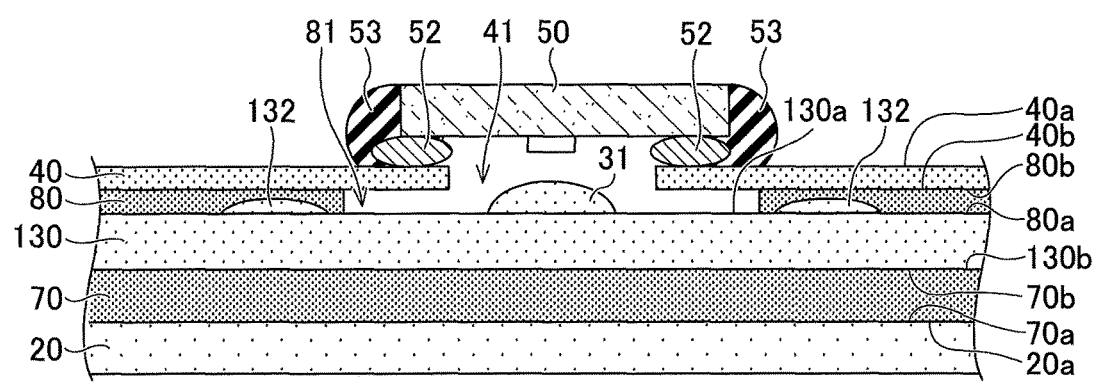

Subsequently, by pressing the flexible substrate 40 downward (in the figure), a region of contact between the adhesive sheet 80 and the flexible substrate 40 expands from the point of contact, as illustrated in FIG. 9B. As a result, the surface 40b of the flexible substrate 40 is bonded to the adhesive sheet 80.

The region of contact between the adhesive sheet 80 and the flexible substrate 40 expands outwardly from the point of contact between the adhesive sheet 80 and the flexible substrate 40. Thus, air remaining between the adhesive sheet and the flexible substrate is pushed to the outside of the region of contact. Accordingly, the adhesive sheet and the flexible substrate can make close contact with each other. Similarly to FIGS. 7A and 7B, even if entrapped air 85 is formed between the adhesive sheet 80 and the flexible substrate 40, it is possible to prevent the entrapped air 85 from reaching the inside of the protrusion 132. FIG. 9A is a top view of the optical module in this state, and FIG. 9B is a cross-sectional view taken through a dashed-dotted line 9A-9B of FIG. 9A.

The adhesive sheet 80 is formed of a material having elasticity. Therefore, as illustrated in FIG. 9B, when the adhesive sheet 80 sandwiched between the protrusion and the flexible substrate 40 is pressed with strong force, the portion of the adhesive sheet 80 becomes thin. Accordingly, even if entrapped air is formed between the flexible substrate 40 and the adhesive sheet 80, the entrapped air is pushed from the thin portion where the adhesive sheet 80 is pressed with strong force toward a thick portion where the adhesive sheet 80 is pressed with less force. Thus, in the protrusion 132, entrapped air 85 is not formed between the lens sheet 130 or the flexible substrate 40 and the adhesive sheet 80.

FIG. 10A is a cross-sectional view taken through a dashed-dotted line 9C-9D of FIG. 9A, and FIG. 10B is a cross-sectional view taken through a dashed-dotted line 9E-9F of FIG. 9A. In FIG. 10A and FIG. 10B, a gap 80c is formed between the lens sheet 130 and the flexible substrate 40 around the adhesive sheet 80. In this state, as illustrated in FIG. 11A and FIG. 11B, an adhesive 151 such as UV curing resin is applied to the periphery of the lens sheet 130. Because the adhesive 151 is a liquid before being irradiated with UV light, the adhesive 151 applied to the periphery of the lens sheet 130 enters the gap 80c between the lens sheet 130 and the flexible substrate 40. Subsequently, by irradiating the adhesive 151 with the UV light, the adhesive 151 is cured, and as a result, the lens sheet 130 and the flexible substrate 40 can adhere to each other.

If entrapped air 85 is present between the adhesive sheet 80 and the lens sheet 130 or between the flexible substrate 40, the adhesive 151 may flow into the entrapped air 85 as the adhesive 151 is a liquid before being cured. However, in the present embodiment, no entrapped air 85 is present in an area where the protrusion 132 is formed. Further, as the adhesive sheet 80 is sandwiched between the protrusion 132 and the flexible substrate 40 and becomes thin by being pressed with strong force, the thin portion serves as a dam, and thus, entrapped air 85 present outside the protrusion does not lead to the through-hole 81. Accordingly, the adhesive 151 applied to the periphery of the adhesive sheet 80 does not flow into the through-hole 81. Thus, it is possible to prevent the adhesive 151 from adhering to the lenses 31.

Accordingly, in the present embodiment, even if entrapped air 85 is present between the adhesive sheet 80 and the lens sheet 130 or the adhesive sheet 80, no entrapped air 85 is present in the area where the protrusion 132 is formed because the adhesive sheet 80 is in close contact with the lens sheet 130 and the adhesive sheet 80. Thus, the adhesive 151 applied to the periphery of the adhesive sheet 80 does not flow into the area where the lenses 31 are formed. Further, a process for removing entrapped air 85 is not required. Accordingly, a high-reliability optical module can be manufactured at a low cost.

(Variations)

Figure 12:
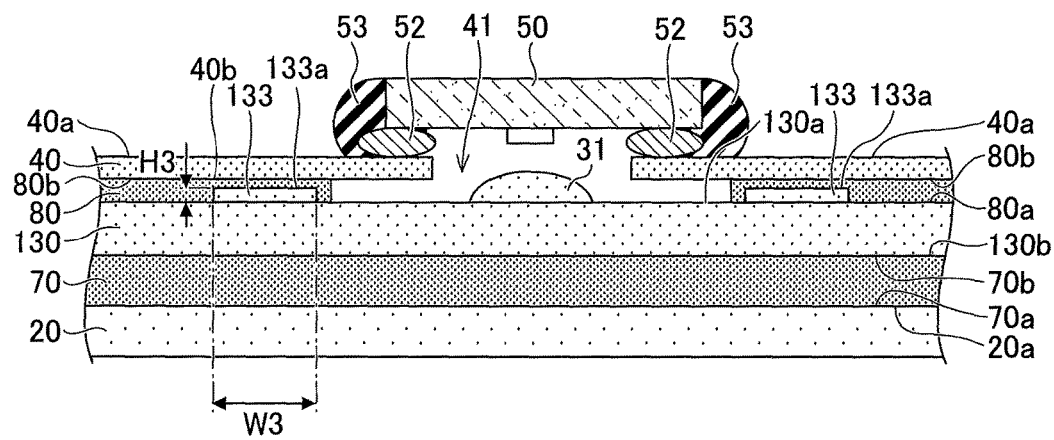
FIG. 12 is a cross-sectional view of an optical module according to a variation 1 of the first embodiment.

According to the present embodiment, as illustrated in FIG. 12, a protrusion 133 on the lens sheet 130 may be formed such that an upper surface 133a is flat. When a width W3 of the protrusion 133 is not very wide even if the upper surface 133a of the protrusion 133 is flat, entrapped air can be pushed outside of the protrusion 133 by using pressure applied when the adhesive sheet 80 and the lens sheet 130 are bonded to each other. For example, the width W3 of the protrusion 133 is greater than or equal to 100 µm and less than or equal to 1,000 µm, and a height H3 is greater than or equal to 10 µm and less than or equal to 15 µm.

Figure 13:
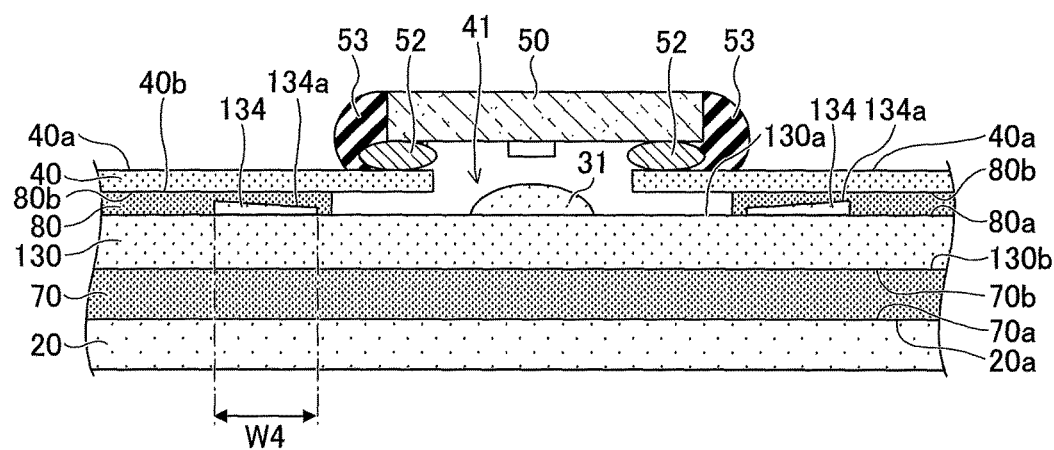
FIG. 13 is a cross-sectional view of an optical module according to a variation 2 of the first embodiment.

Further, according to the present embodiment, as illustrated in FIG. 13, a protrusion 134 may be formed such that an upper surface 134a is flat and one side closer to the lenses 31 becomes lower. By forming the protrusion 134 such that the side closer to the lenses 31 is lower, the adhesive sheet 80 makes contact with the highest portion of the upper surface 134a first. Subsequently, a region of contact between the upper surface 134a and the adhesive sheet 80 expands from the highest portion toward the side closer to the lenses 31. Accordingly, air between the upper surface 134a and the surface 80a is pushed to a through-hole 81 side of the adhesive sheet 80, and eventually exits the through-hole 81. A width W4 of the upper surface 134a is, for example, greater than or equal to 100 µm and less than or equal to 1,000 µm.

Figure 14A:
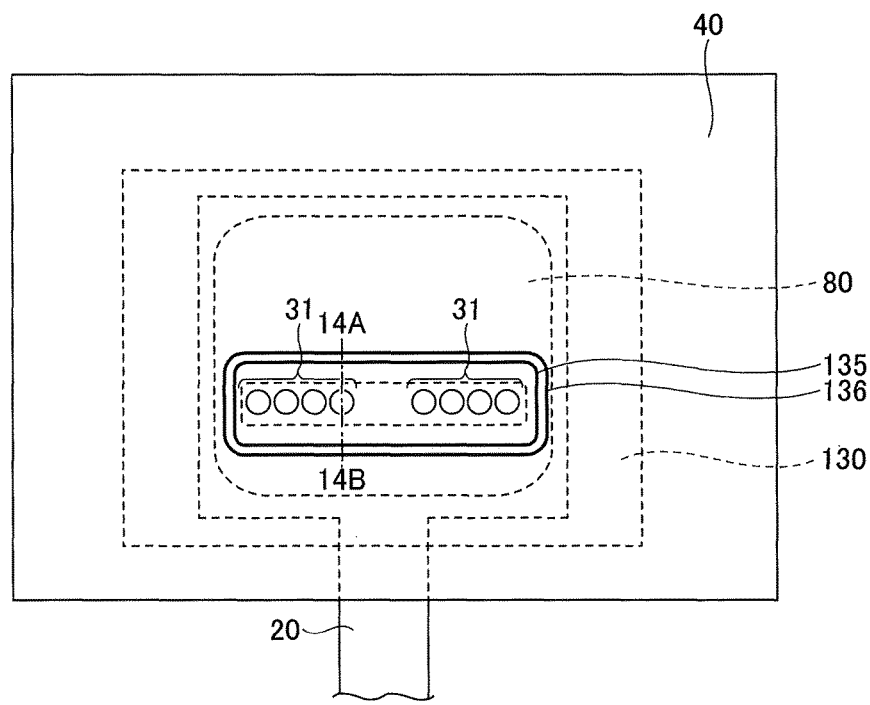
FIG. 14A is a top view of an optical module according to a variation 3 of the first embodiment.
Figure 14B:
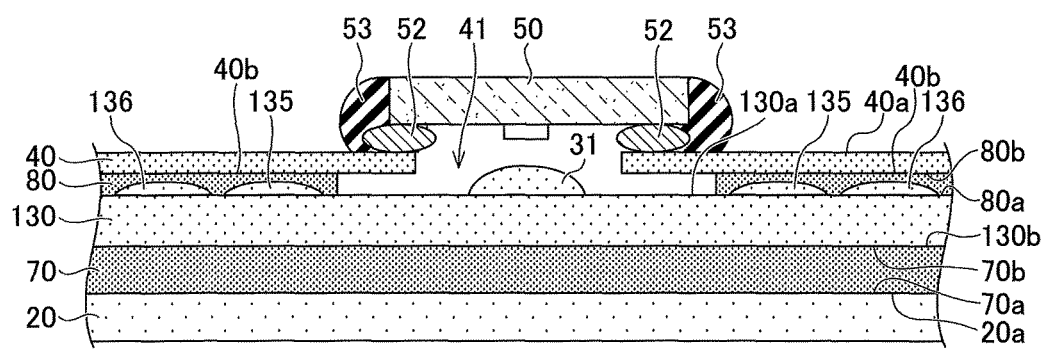
FIG. 14B is a cross-sectional view of the optical module according to variation 3 of the first embodiment.

Further, according to the present embodiment, as illustrated in FIGS. 14A and 14B, a plurality of protrusions surrounding the lenses 31 may be formed. FIG. 14A is a top view illustrating an optical module with this configuration and FIG. 14B is a cross-sectional view taken through a dashed-dotted line 14A-14B of FIG. 14A.

To be more specific, as illustrated in FIGS. 14A and 14B, a first closed protrusion 135 is formed so as to surround the lenses 31 and a second closed protrusion 136 may be formed so as to surround the first protrusion 135. By forming the dual protrusions, the first protrusion 135 and the second protrusion 136 serve as dual dams. Thus, the adhesive 151 can be further prevented from entering the through-hole 81 and reliability can also be improved. The protrusions may be more than dual and may be triple or quadruple.

As described, according to the present embodiment, a lens sheet and an adhesive sheet are bonded to each other at a protrusion/projection of the lens sheet. In the cross-sectional direction, the sheets make approximately point contact with each other in a cross-sectional direction. Thus, no entrapped air is generated at the protrusion/projection.

Subsequently, a process for bonding the lens sheet to the adhesive sheet is performed. A region of contact between the lens sheet and the adhesive sheet expands outwardly from the initial point of contact. At this time, air remaining between the sheets is pushed outward.

Even if air were to remain between the lens sheet and the adhesive sheet, because the protrusion/projection serves as a dam, the entrapped air does not flow through the protrusion/projection into the inside or the entrapped air present outside of the protrusion/projection region does not lead to a through-hole where lenses are disposed. Therefore, even in a case where an adhesive applied to the periphery of the adhesive sheet were to seep into the sheet, it is possible to prevent the adhesive from flowing through voids formed by entrapped air into the through-hole.

A relationship between an adhesive sheet and a substrate is similar to the above. To be more specific, the substrate is bonded to a side of the adhesive sheet opposite to a lens sheet side at a raised portion formed by the protrusion/projection. In the cross-sectional direction, the sheets make approximately point contact with each other. Thus, no entrapped air is present at the raised portion.

Subsequently, the substrate is bonded to the adhesive sheet. A region of contact between the sheets expands outwardly from the initial point of contact. At this time, air remaining between the sheets is pushed outward.

Even if air were to remain between the adhesive sheet and the substrate and an adhesive applied to the periphery of the adhesive sheet were to seep into the sheet, it is possible to prevent the adhesive from flowing through voids formed by the entrapped air into the through-hole.

Second Embodiment

Figure 15A:
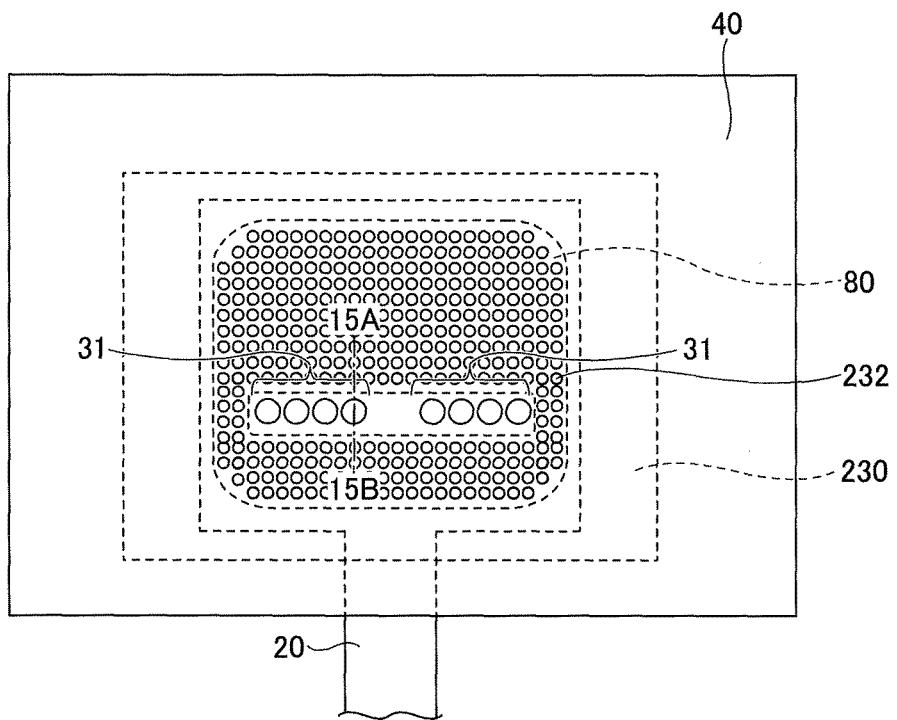
FIG. 15A is a top view of an optical module according to a second embodiment.
Figure 15B:
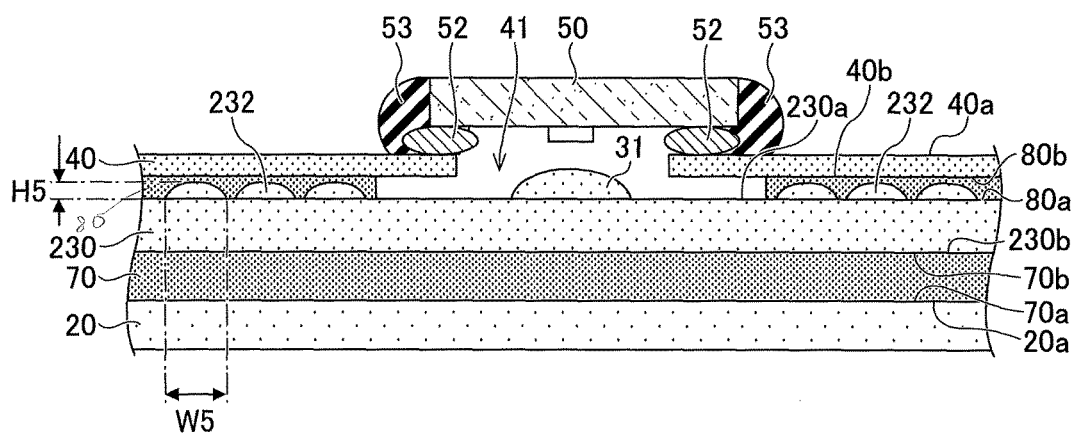
FIG. 15B is a cross-sectional view of the optical module according to the second embodiment.

Next, a second embodiment will be described. As illustrated in FIGS. 15A and 15B, an optical module according to the present embodiment includes projections 232 around lenses 31. FIG. 15A is a top view of the optical module from which the light emitter 50 and the like are omitted, and FIG. 15B is a cross-sectional view of the optical module taken through a dashed-dotted line 15A-15B of FIG. 15A. The projections 232 are formed in circular shapes in top view. The projections 232 each have a curved spherical or non-spherical surface.

In the present embodiment, the projections 232 are formed around the lenses 31 on the surface 230a of the lens sheet 230. Accordingly, when the adhesive sheet 80 is bonded to the lens sheet 230, the adhesive sheet 80 first makes contact with tops of the projections 232. Subsequently, by downwardly pressing the adhesive sheet 80 toward the lens sheet 230, a region of contact between the adhesive sheet 80 and the lens sheet 230 expands from the tops of the projections 232, and air is pushed outside of the projections 232. Accordingly, no entrapped air is formed between the adhesive sheet and the lens sheet.

Further, when the flexible substrate 40 is bonded to the adhesive sheet 80, the adhesive sheet 80 is sandwiched between the lens sheet 230 and the flexible substrate 40 and a force is applied to the adhesive sheet 80. Therefore, even if entrapped air is formed between the projections 232, the entrapped air passes through between the projections 232 and is pushed to the outside of the adhesive sheet 80. Therefore, entrapped air is not readily formed between the adhesive sheet and the lens sheet 230 or the flexible substrate 40. However, even if entrapped air were to be formed, such entrapped air bubbles are not connected to each other because of extremely small sizes. Also, the gap 80c does not lead to the through-hole 41. Note that the lens sheet 230 is bonded to the adhesive sheet 70.

In the present embodiment, if the projections 232 formed around the lenses 31 are very large, entrapped air may be formed between the projections 232. Conversely, if the projections 232 are very small, the projections 232 could become nearly flat. Therefore, a width W5 and a height H5 of each of the projections 232 are preferably set to appropriate values. The width W5 is, for example, greater than or equal to 10 μm and less than or equal to 50 μm, and the height H5 is, for example, greater than or equal to 10 μm and less than or equal to 15 μm.

In the present embodiment, a process for removing entrapped air is not required, and a high-reliability optical module can be manufactured at a low cost.

Figure 16A:
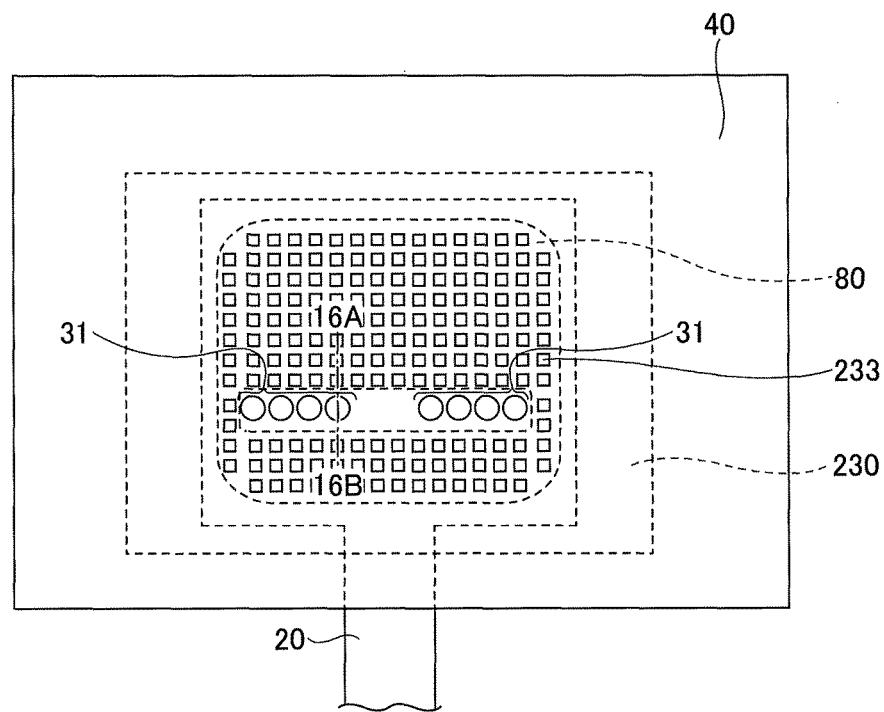
FIG. 16A is a top view of an optical module according to a variation of the second embodiment.
Figure 16B:
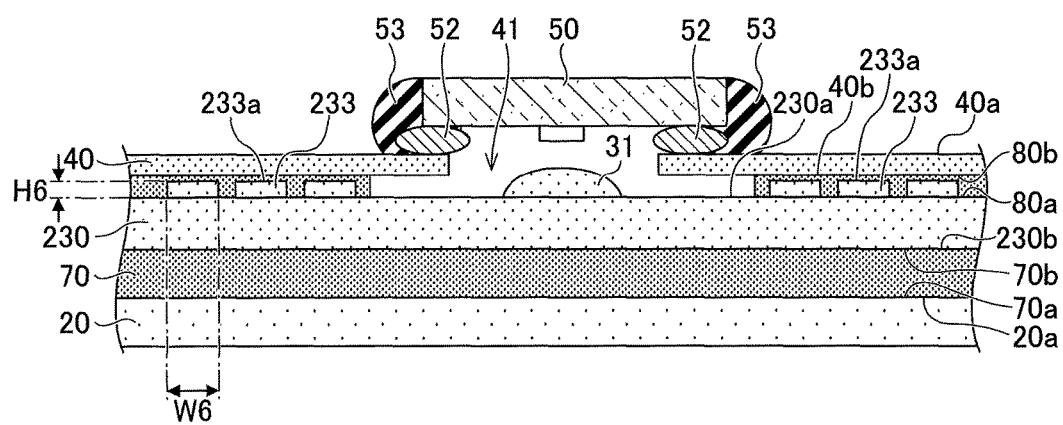
FIG. 16B is a cross-sectional view of the optical module according to the variation of the second embodiment.

Further, in the present embodiment, as illustrated in FIGS. 16A and 16B, projections 233 may be formed in square shapes in top view, and upper surfaces 233a of the projections 233 may be flat. FIG. 16A is a top view of an optical module, and FIG. 16B is a cross-sectional view of the optical module taken through a dashed-dotted line 16A-16B of FIG. 16B.

In this case as well, if the projections 233 are large, the upper surfaces 233a become approximately flat and entrapped air may be formed. Therefore, a width W6 of each of the projections 233 is, for example, greater than or equal to 10 μm and less than or equal to 50 μm, and a height H5 is, for example, greater than or equal to 10 μm and less than or equal to 15 μm.

Details other than the above are the same as those in the first embodiment.

Third Embodiment

Figure 17A:
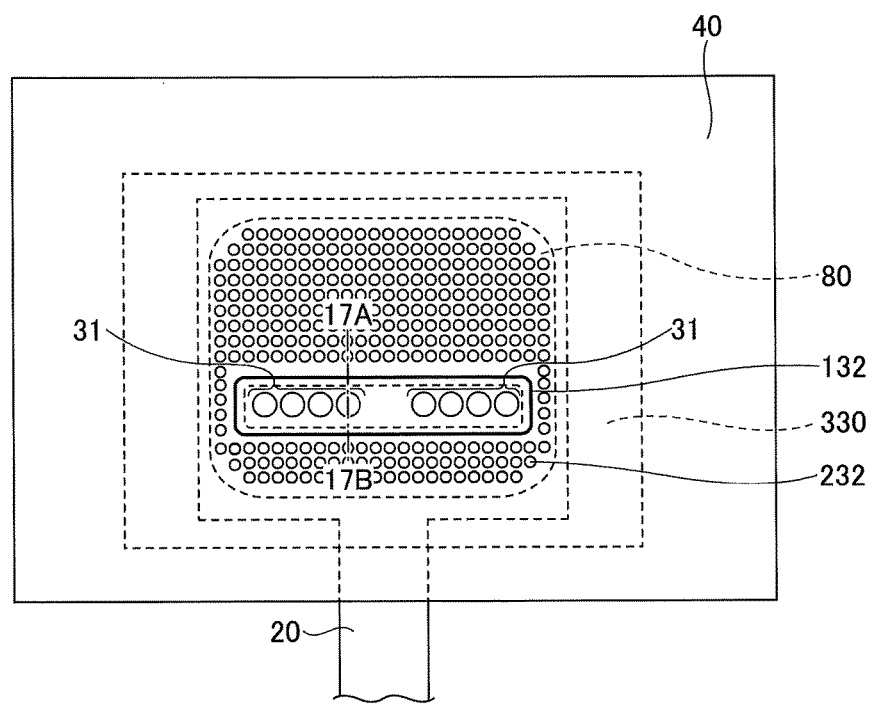
FIG. 17A is a top view of an optical module according to a third embodiment.
Figure 17B:
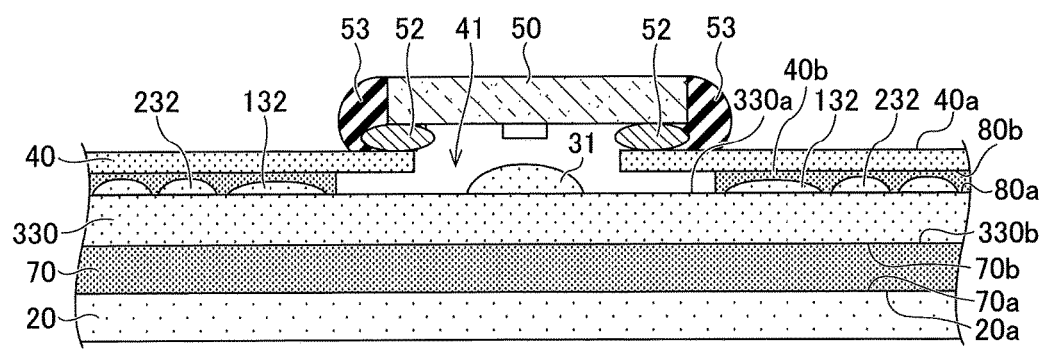
FIG. 17B is a cross-sectional view of the optical module according to the third embodiment.

Next, a third embodiment will be described. An optical module according to the present embodiment has a structure that combines the first embodiment and the second embodiment. To be more specific, as illustrated in FIGS. 17A and 17B, the protrusion 132 is formed so as to surround the lenses 31, and the projections 232 are formed around the protrusion 132. FIG. 17A is a top view of the optical module from which the light emitter 50 and the like are omitted, and FIG. 17B is a cross-sectional view of the optical module taken through a dashed-dotted line 17A-17B.

In the present embodiment, the protrusion 132 can prevent the adhesive 151 applied to the periphery of the adhesive sheet 80 from flowing into the through-hole 81, and can also prevent the entrapment of air between the adhesive sheet 80 and the flexible substrate 40.

Figure 18A:
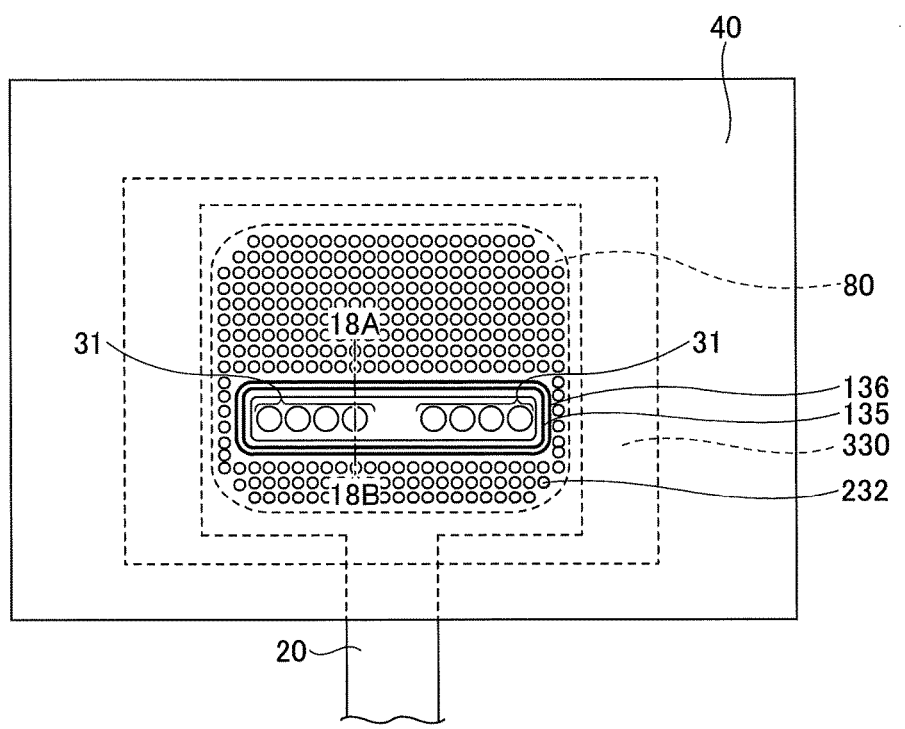
FIG. 18A is a top view of an optical module according to a variation of the third embodiment.
Figure 18B:
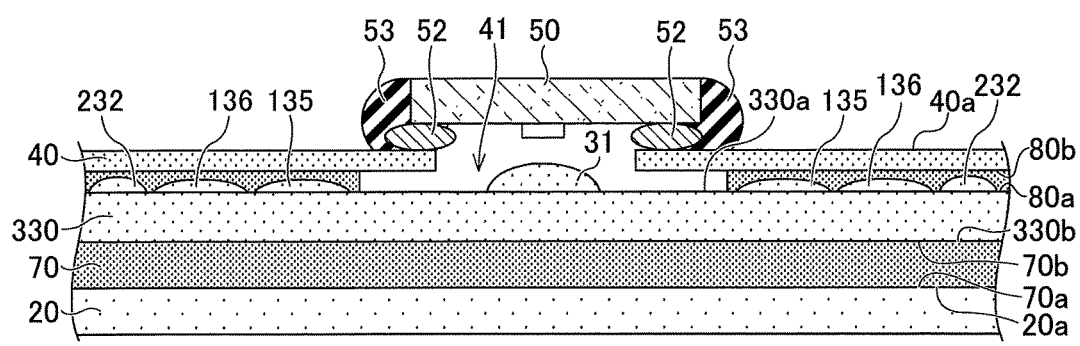
FIG. 18B is a cross-sectional view of the optical module according to the variation of the third embodiment.

Further, in the present embodiment, as illustrated in FIGS. 18A and 18B, dual protrusions may be provided. In FIGS. 18A and 18B, a first protrusion 135 is formed so as to surround the lenses 31, and a second protrusion 136 is formed so as to surround the first protrusion 135. The projections 232 are formed around the second protrusion 136. FIG. 18A is a top view of an optical module from which the light emitter 50 and the like are omitted, and FIG. 18B is a cross-sectional view of the optical module taken through a dashed-dotted line 18A-18B of FIG. 18A.

Details other than the above are the same as those in the first and second embodiment.

Although the embodiments have been described above, the present disclosure is not limited to the above-described embodiments. Various variations and modifications may be made without departing from the scope of the present invention.

What is claimed is:

1. An optical module comprising:
   a lens sheet having at least one lens and a protrusion formed so as to surround the lens on one surface thereof;
   a substrate having at least one of a light emitter or a light receiver on one surface thereof; and
   an adhesive film provided so as to cover a top surface of the protrusion that faces the substrate and configured to bond the lens sheet to the substrate.

2. The optical module according to claim 1, wherein a second protrusion is formed on the lens sheet so as to surround the protrusion.

3. The optical module according to claim 1, wherein a surface of the protrusion includes a curved surface.

4. The optical module according to claim 1, wherein the protrusion is a region in which a plurality of protrusions is formed so as to surround the lens.

5. The optical module according to claim 1, wherein the protrusion continuously extends around the lens so as to completely surround the lens.

6. The optical module according to claim 1, further comprising an adhesive provided to a periphery of the adhesive film, said adhesive being cured after applied to the periphery of the adhesive film.

* * * * *